United States Patent [19]

Wong et al.

[11] Patent Number: 4,795,240
[45] Date of Patent: Jan. 3, 1989

[54] HIGH SPEED INFRARED SHUTTER

[75] Inventors: Jacob Y. Wong, Santa Barbara; Lawrence J. Schoennauer, San Luis Obispo, both of Calif.

[73] Assignee: Hibshman Corporation, San Luis Obispo, Calif.

[21] Appl. No.: 86,596

[22] Filed: Aug. 18, 1987

[51] Int. Cl.$^4$ ............................ G02F 1/01; G02F 1/03
[52] U.S. Cl. ..................................... 350/353; 350/356
[58] Field of Search ................................ 350/353, 356

[56] References Cited

U.S. PATENT DOCUMENTS 4,545,641 10/1985 Sobey, Jr. ............................. 350/353
4,615,587 10/1986 Krasutsky et al. ................... 350/363

OTHER PUBLICATIONS

Weiser, K. and I. Chang, "Optically Erasing A Thermally Biased Thermally Switchably Film", IBM Technical Disclosure Bulletin, vol. 16, No. 7, pp. 2075-2076, Dec. 1973.

Primary Examiner—Eugene R. LaRoche
Assistant Examiner—Nathan W. McCutcheon
Attorney, Agent, or Firm—Daniel C. McKown

[57] ABSTRACT

A shutter having no moving parts and intended for use at infrared wavelengths includes a thin film of vanadium dioxide deposited on an insulative layer of silicon oxide that has been grown on a thin substrate of semiconductive silicon. The layers are in good thermal contact, but the vanadium dioxide film is electrically insulated from the silicon substrate. The vanadium dioxide film is heated by passing a heating current through the semiconductive substrate, and is cooled by radiation. The resistance of the vanadium dioxide film is sensed continuously, and is used for turning on and turning off the heating current.

9 Claims, 2 Drawing Sheets

HIGH SPEED INFRARED SHUTTER

BACKGROUND OF THE INVENTION

1. Field of the Invention

The present invention is in the field of light modulation devices particularly for infrared radiation wherein thin films of vanadium dioxide are caused to change their optical and electrical characteristics such as reflectance and conductivity in response to thermal stimuli. More specifically, the present invention relates to a novel device structure that is operable as a high-speed infrared shutter or modulator.

2. The Prior Art

The use of reversible thermodynamic transitions between the semiconductor and metal states for vanadium dioxide crystal as a means of thermally modulating its reflectivity, thereby achieving the function of an optical modulator, appears to have been first disclosed in U.S. Pat. No. 3,484,722 by Barker, et al. As the temperature of a vanadium dioxide crystal is raised, the crystal changes from a slightly reflective semiconductor below about 68 degrees C. to a highly refective metallic phase at temperatures above about 68 degrees C.

Although the transition effect can easily be demonstrated under laboratory conditions by a human operator who gradually increases or decreases the temperature of the vanadium dioxide film, it is much more difficult to devise a system which will produce hundreds or thousands of transitions each second without human intervention. The present invention addresses this latter problem.

In U.S. Pat. No. 4,283,113 Eden disclosed an apparatus for switching light between optical fibers. The apparatus comprises a vanadium dioxide thin film switchable between high reflectence (above 68 degrees C.) and high transmission (below 68 degrees C.) states. Eden positions a series of thermoelectric junctions around the edge of the film and in thermal contact with the film for selectively heating and cooling the film above or below its transition temperature to switch the film between its transmitting and reflecting states. Switching rates of several hertz are mentioned.

Other inventors, notably Mattis in U.S. Pat. No. 3,664,726 and McConnell, et al. in U.S. Pat. No. 3,834,793 disclose devices in which thermochromic materials are used for modulating light.

The use of thermoelectric (TE) coolers for selectively heating and cooling the vanadium dioxide thin film and substrate above or below its transition temperature (68 degrees C.), as suggested in U.S. Pat. No. 4,283,113 to Eden, can achieve at best a switching speed of a few hertz, even with the latest available TE cooler technology. The use of resistive type heaters for heating the vanadium dioxide film and substrate above the transition temperature as disclosed in U.S. Pat. No. 3,664,726 to Mattis does not switch any faster. In this case, one has to take into consideration also the cooling time needed to return the film and substrate to below the transition temperature.

Optical modulators that are capable of switching at only a few hertz have very limited applications in communication and instrumentation areas. Minimum switching speeds of at least tens of hertz to hundreds of hertz are ordinarily required in most applications.

SUMMARY OF THE INVENTION

It is an object of the present invention to provide a novel device structure for thermochromic thin film optical modulators, such as vanadium dioxide, in order to achieve switching speeds of at least several hundred hertz between the high reflectance and the high transmission states.

It is a further object of the present invention to include within the same device an electrical means of continuously monitoring the transitional state of the vanadium dioxide film. Such a monitoring output is used to control the heating of the vanadium dioxide film.

In accordance with a preferred embodiment, a thin insulative layer (about 1500 Angstroms) of silicon dioxide is thermally grown on one side of a thin silicon substrate. Then a thin film of vanadium dioxide is deposited on the exposed side of the silicon dioxide layer. Ohmic contacts are provided on the silicon substrate to permit it to be used for heating the vanadium dioxide layer. Ohmic contacts are also provided to the vanadium dioxide layer, but these contacts and the vanadium dioxide layer are insulated from the silicon substrate and its contacts by the insulative layer of silicon dioxide. This latter set of ohmic contacts is used for monitoring the impedance of the vanadium dioxide layer.

The silicon substrate is selected to have a particular resistivity value such that when it is thinned down to reduce the combined thermal mass of the $VO_2$ film and substrate, the resistance per square has a value (e.g., 100 ohms) that can be conveniently powered by low voltage sources (15 V or less). The thickness of the silicon substrate is a major factor in determining the frequency at which the infrared shutter can be operated. The smaller the thermal mass of the shutter the faster it will switch.

As the $VO_2$ film changes from the semiconductor phase to the metal phase the impedance of the $VO_2$ film drops abruptly from, typically, several kilo-ohms to tens of ohms. Thus, it is very convenient to monitor the impedance of the $VO_2$ film to ascertain which phase it is in. A circuit is provided to heat the silicon substrate carrying the $VO_2$ film; it uses the film impedance as the basis for applying the heat. Power is applied electrically until the film impedance drops below a value indicative of the metal phase. Power is resumed after the film has cooled and its impedance has increased to a value indicative of the semiconductor phase. The drive circuit thus supplies a series of spaced heating pulses to the silicon layer.

The preferred embodiment described above is especially suited to operate as a high-speed shutter in the infrared. Since the silicon substrate is transparent throughout the infrared region, a high transmission is assured when the $VO_2$ film is in the semiconductor phase. Although silicon dioxide has several strong absorption bands throughout the infrared, a thickness of 1,500 Å, however, renders such absorptions negligible. To further enhance transmission of infrared radiation in the semiconductor phase, the silicon substrate can be antireflection coated.

The present invention is a significant improvement over previously used systems in which the $VO_2$ film temperature was inferred from the temperature of the substrate measured at some distance from the film. It was found that these temperatures sometimes differed as the ambient temperature changed, causing the switching to occur at varying uncontrolled values of reflectivity. In contrast, the present invention takes full advantage of the intimate and concomitant relationship between the electrical resistance of the VO₂ film and its optical reflectivity. In accordance with the present invention, these quantities necessarily subsist at the same time and place. The switching points correspond directly to specific reflectivity values, and this intimate relationship is not affected by variations in ambient temperature, thereby greatly improving the stability of the device.

The objectives and advantages of the present invention will become clear from the detailed description given below in relation to the drawings for the preferred embodiment. The detailed description is presented to illustrate the present invention, but is not intended to limit it.

DETAILED DESCRIPTION OF THE PREFERRED EMBODIMENT

Figure 1:
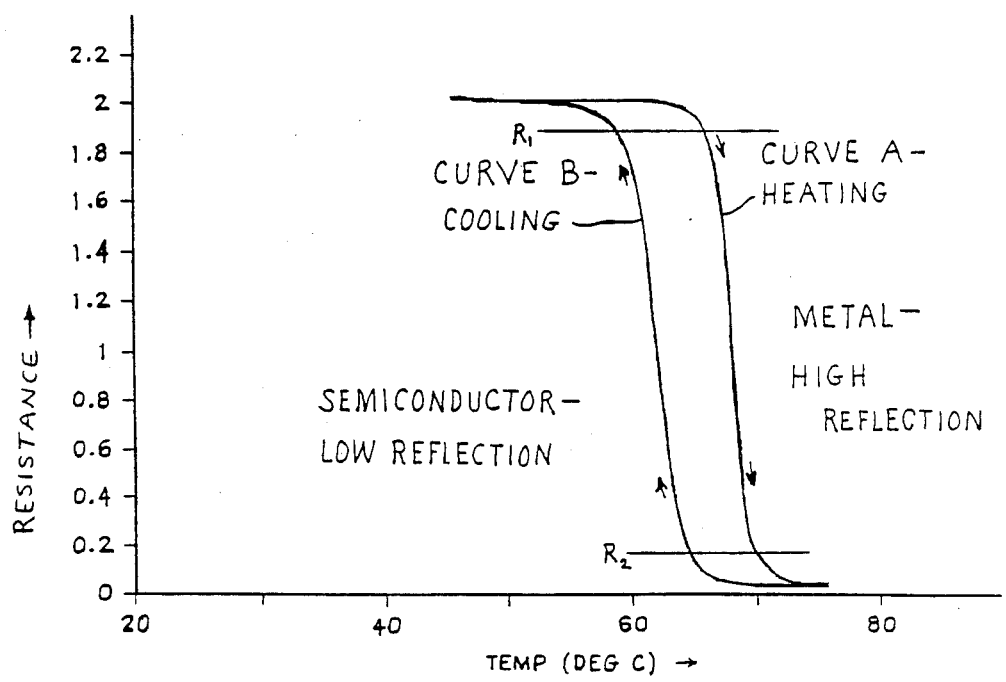
FIG. 1 is a graph showing the resistance of a typical film of vanadium dioxide in a shutter made in accordance with the present invention as a function of the temperature of the film.

Turning now to the drawings in which like parts are denoted by the same reference numeral throughout, FIG. 1 is a graph showing how the resistance of a vanadium dioxide film varies as the film is heated and cooled.

At temperatures below approximately 56 degrees C., substantially all of the material is a semiconductor and exhibit low reflectivity to infrared radiation.

At temperatures above 72 degrees C., substantially all of the vanadium dioxide is in a metallic state and exhibits high reflectivity to infrared radiation.

At temperatures between 56 degrees C. and 72 degrees C., the vanadium dioxide undergoes a phase transition.

The vanadium dioxide film includes a myriad of small, crystal-like groups of molecules called crystallites. As explained in U.S. Pat. No. 4,283,113 to Eden, because of strain sets present in the vanadium dioxide thin film, each individual crystallite is switched at a slightly different transition temperature. As the temperature of the film is increased, an increasing number of the crystallites will be switched from the semiconductor state to the metallic state as the transition temperatures of the individual crystallites are exceeded. Strictly speaking, the film has no single transition temperature because it is an aggregation of crystallites having different transition temperatures. The material exhibits a hysteresis in that the resistance at a particular temperature in the transition zone depends on the thermal history of the material.

Assuming the temperature of the film initially is less than 56 degrees C., and heat is being applied to the film, the resistance will decrease in accordance with curve A as the temperature of the film is increased. Assume that at approximately 75 degrees C. the heat input is removed and the film is permitted to cool. The resistance then follows curve B as the temperature of the film decreases. Thus, during a particular cycle, the resistance drops very rapidly in the transition zone as the film is heated, and then increases at a comparable rate, but on a different curve, as the film cools. This hysteresis effect, which is also present in the graphs of reflectivity versus temperature, makes it more difficult to achieve rapid switching rates between the two states. The vanadium dioxide film must be heated and cooled through a range of temperatures on the order of 10 degrees C. to achieve the desired alternations in the phase of the vanadium dioxide.

For a required optical aperture size, this dictates the use of relatively thin films and substrates, so as to minimize the mass that needs to be heated and cooled.

Figure 2:
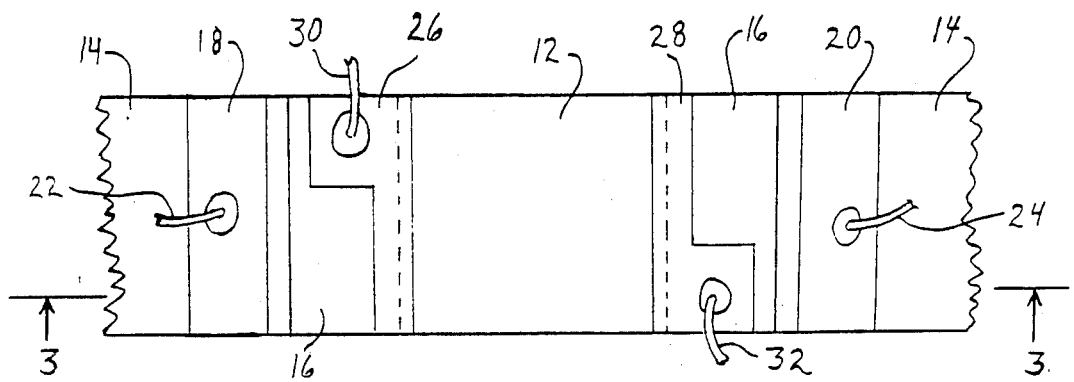
FIG. 2 is a top plan view diagram showing the arrangement of the components on a substrate in a preferred embodiment of the present invention.
Figure 3:
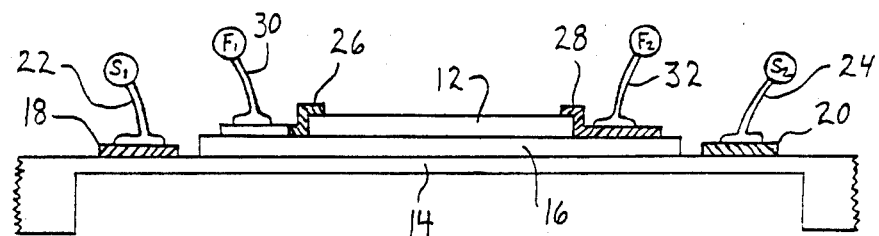
FIG. 3 is a side elevational cross sectional diagrammatic view showing the embodiment of FIG. 2 in the direction 3—3 shown in FIG. 2.

As best seen in FIGS. 2 and 3, in accordance with a preferred embodiment of the present invention, a thin layer 16 of silicon dioxide is thermally grown on one side of a thin silicon substrate 14. Next, a 3000 Å film 12 of vanadium dioxide is deposited on the exposed side of the silicon dioxide layer 16. Conductive pads 18, 20 provide an ohmic contact with the silicon substrate 14, and lead wires 22, 24 are attached respectively to the conductive pads 18, 20. The silicon substrate 14 is a semiconductor and the silicon substrate 14 is heated when an electric current is passed through it by use of the lead wires 22, 24.

The silicon dioxide layer 16 serves to insulate the film of vanadium dioxide 12 from the silicon substrate 14. The thickness of the layer of silicon dioxide is approximately 1500 Å; because of its thinness, the layer is transparent to infrared radiation. As shown in FIGS. 2 and 3, conductive pads 26, 28 are deposited on the layer of silicon dioxide 16 and these conductive pads also are in ohmic contact with the film of vanadium dioxide 12. The conductive pads 26, 28 are provided with, respectively, lead wires 30, 32. Thus, in the embodiment shown in FIGS. 2 and 3, the vanadium dioxide film 12 and its lead wires 30, 32 are electrically insulated by the layer 16 of silicon dioxide from the silicon substrate 14 and its lead wires 22, 24. This electrical isolation makes it possible to sense the electrical resistance of the film 12 of vanadium dioxide, even while the substrate 14 is being heated. Heating of the substrate 14 is accomplished by passing an electrical current through it.

Referring to FIG. 1, the resistance $R_2$ is selected to correspond to a desired high reflectivity of the film 12 of vanadium dioxide. Likewise, the resistance value $R_1$ corresponds to a desired high level of transmittance of the film 12 of vanadium dioxide. Assuming the film 12 is initially at room temperature, it is clear that heat should be applied to it until the resistance of the film falls below the value $R_2$. At that instant, the heating current should be interrupted to permit the cooling cycle to begin. Most of the cooling occurs through conduction and convection. As the cooling continues, the resistance increases as shown by curve B of FIG. 1, until, at some instant, the resistance value $R_1$ is reached. At this point, the heating current through the film 12 may be resumed.

The advantage of heating the film 12 of vanadium dioxide indirectly, by heating the silicon substrate 14, can now be appreciated. If the electrical heating current flowed directly through the film 12 of vanadium dioxide, the current would have to vary as the reciprocal of the square root of the instantaneous resistance to avoid exceeding some maximum rate of power input. Although it is not impossible to devise a way of doing this, it certainly requires a more complicated power supply than that used in the present invention. Although the resistance of the film 12 of vanadium dioxide varies by about a factor of 10 from $R_1$ to $R_2$, the resistance of the silicon substrate 14 remains practically constant, thereby permitting the use, in the present invention, of a constant current source or constant voltage source such as a battery.

Figure 4:
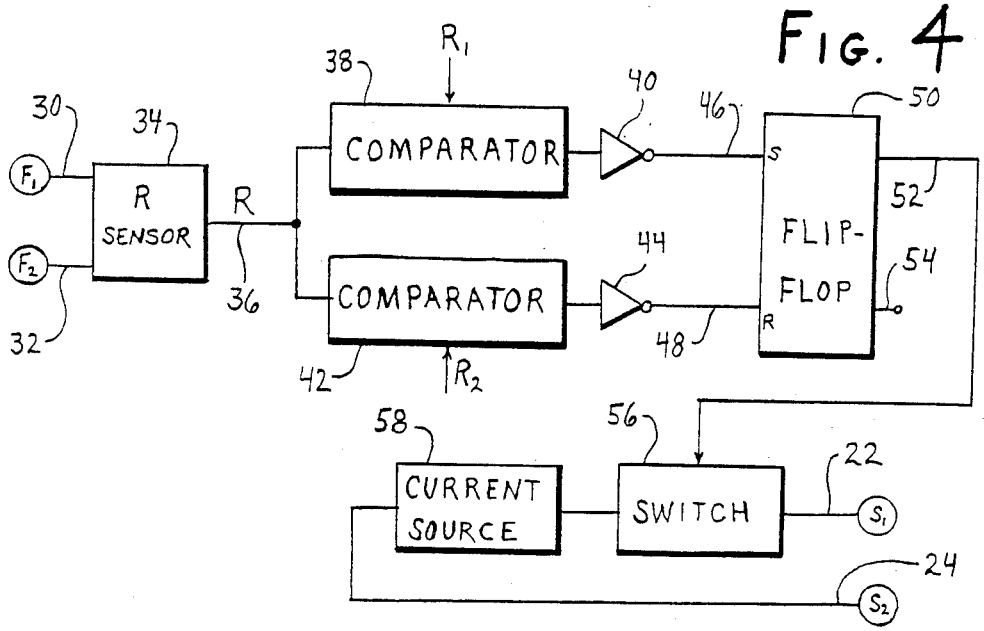
FIG. 4 is a block diagram showing a circuit used in the preferred embodiment for applying a controlled heating current to the substrate of the shutter; and, FIG. 5 is a diagram showing an optical shutter employing the device shown in FIG. 2.

The circuit used in the present invention for controlling the flow of heating current to the silicon substrate 14 is shown in FIG. 4. The resistance sensor 34 is connected to the wires 30, 32, and produces an electrical output signal on the line 36 that is a voltage proportional to the sensed instantaneous resistance R. Circuits for sensing resistance are well-known in the art and need not be described in detail here.

The voltage on the line 36 is applied to the comparator 38, to which a voltage representing the set point resistance $R_1$ (shown in FIG. 1) is also applied. The comparator 38 tests to determine whether the instantaneous film resistance R exceeds $R_1$, and if it does, the comparator 38 produces as an output a logical "0"; but if R does not exceed $R_1$, the comparator 38 remains in the logical "1" state. The logic output of the comparator 38 is applied to the logic inverter 40 that converts the 1's to 0's and the 0's to 1's. The inverted comparator output is applied to the flip-flop 50 on the line 46.

The flip-flop 50 produces an output on the line 52 that controls a switch 56, that in turn controls the application of electrical current from a current source 58 to the lead wires 22, 24 of the silicon substrate 14.

When R exceeds $R_1$, a logical "1" is applied on the line 46 to the "set" input of the flip-flop 50, closing the switch 56 so as to initiate heating of the substrate 14.

Similarly, the comparator 42 tests to determine whether the instantaneous resistance R is less than the lower set point resistance $R_2$ (shown in FIG. 1). If it is, the comparator 42 produces a "0"; but if it is not, the comparator produces a "1". These logic outputs of the comparator 42 are inverted by the logic inverter 44 before being applied on the line 48 to the "reset" input of the flip-flop 50.

In operation, if the device is initially at room temperature, the instantaneous resistance exceeds $R_1$, and therefore the S input of the flip-flop 50 is a "1" and the R input is a "0". These inputs will cause the flip-flop 50 to produce a logical "1" on the line 52, which closes the switch 56 to apply heating current to the silicon substrate. As the film 12 of vanadium dioxide heats up, its resistance falls below $R_1$, and the S input of the flip-flop becomes a "0". Since both inputs of the flip-flop are now 0's, the output on the line 52 will remain unchanged and heating current will continue to flow. When the film 12 has been heated sufficiently that its resistance falls below $R_2$, then the R input to the flip-flop 50 becomes a "1", which resets the output on line 52 to a "0", thereby opening the switch 56 and terminating the flow of current to the silicon substrate. As the film 12 cools, its resistance exceeds $R_2$, thereby changing the R input to the flip-flop 50 from a "1" to a "0". However, since both inputs to the flip-flop are now 0's, the output of the flip-flop remains a "0" on the line 52 and the switch 56 remains open.

With the R input now a "0" the film 12 continues to cool until its instantaneous resistance R exceeds $R_1$, which sets the flip-flop so that its output on line 52 changes from a "0" to a "1". This output on the line 52 closes the switch 56, once again starting the flow of heating current. The complementary output 54 of the flip-flop 50 is not used.

In the interest of achieving rapid switching, as much power is applied to the silicon substrate 14 during the heating interval as possible without damaging any of the parts of the device.

The system described in connection with FIGS. 2–4 is designed to provide a rapid opening and closing of the shutter in the sense that the central portion of the device is alternately transmissive or reflective. The design is intended to provide a rapid repetition rate.

Figure 5:
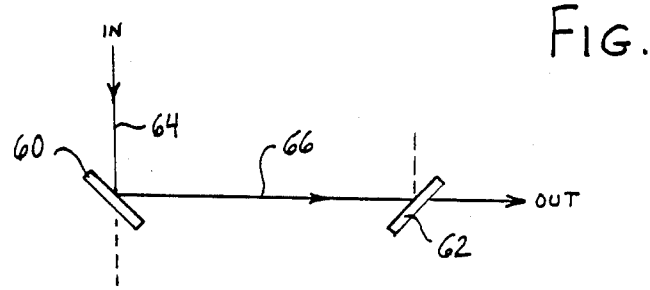

If, in contrast, it is desired to produce only a single opening and closing of the shutter, i.e., a single exposure, the device of the present invention may be used in the manner shown in FIG. 5. A first shutter 60 similar to that shown in FIGS. 2 and 3 is oriented at 45 degrees with respect to the light to be passed. A second shutter 62, also similar to that shown in FIGS. 2 and 3 is positioned to receive the radiation reflected from the first shutter 60 and to selectively pass or reflect it.

The operation of the system of FIG. 5 is based on applying the heating current to the second shutter 62 slightly after the heating current is applied to the first shutter 60. Initially, the incoming light beam 64 passes through the first shutter 60 because it is still in the semiconductive phase. Upon application of the heating current, the first shutter 60 enters the metallic phase and becomes highly reflective. The incoming light beam 64 is then reflected as shown by the beam 66 The beam 66 is transmitted by the second shutter 64, but only until the heating current pulse is applied to the second shutter. Thereafter, the beam 66 is reflected by the second shutter. The length of time during which the radiation passes through the second shutter 62 can be very brief, and is the exposure time of the system. In the system of FIG. 5, both the opening of the shutter and the closing of it are in accordance with curve A of FIG. 1.

Thus, there has been described a high speed shutter for use with infrared radiation and which has no moving parts. The shutter makes use of a phase transition in a vanadium dioxide film. Heating current is not applied directly to the vanadium dioxide film, but instead, is applied to a semiconductive silicon substrate on which an insulative layer of silicon oxide is grown, on which the film of vanadium dioxide is deposited. This technique avoids the thermal runaway problem that would be encountered if the current were passed directly through the vanadium dioxide layer whose resistance rapidly decreases as the film enters the metallic state.

The foregoing detailed description is illustrative of one embodiment of the invention, and it is to be understood that additional embodiments thereof will be obvious to those skilled in the art. The embodiments described herein together with those additional embodiments are considered to be within the scope of the invention.

What is claimed is:

1. A high speed shutter for selectively transmitting incident radiation, comprising in combination:

a substrate in the form of a sheet of semiconductive material that has two sides and that is transmissive to the incident radiation;

an electrically insulative film that is transmissive to the incident radiation and that is applied to one side of said substrate;

a film of a thermochromic material applied to said electrically insulative film and thin enough to transmit a substantial portion of the incident radiation when said film is in its semiconductive state;

first means electricaly connected to said film of a thermochromic material for sensing its electrical resistance R and producing a signal representative of the sensed resistance; and, second means electrically connected to said substrate and electrically connected to said first means for receiving said signal, for producing a spatially substantially uniform flow of current across said substrate for heating it in relation to the resistance sensed by said first means.

2. The high speed shutter of claim 1 wherein said second means further comprise circuit means for initiating the flow of current across said substrate when the electrical resistance R of said film of a thermochromic material increases beyond a preset value $R_1$ and for terminating the flow of current across said substrate when the electrical resistance R of said film of a thermochromic material falls below a preset value $R_2$.

3. The high speed shutter of claim 1 wherein said film of a thermochromic material is rectangular in shape and wherein said second means further comprise a pair of conductive terminals extending along opposite sides of said film of a thermochromic material.

4. The high speed shutter of claim 1 wherein said incident radiation is infrared radiation.

5. The high speed shutter of claim 1 wherein said substrate is silicon.

6. The high speed shutter of claim 1 wherein said insulative film is silicon dioxide.

7. The high speed shutter of claim 6 wherein the thickness of said insulative film is about 1500 Å.

8. The high speed shutter of claim 1 wherein said thermochromic material is vanadium dioxide.

9. The high speed shutter of claim 8 wherein the thickness of said film of a thermochromic material is about 3000 Å.

* * * * *